(12) United States Patent
Cermak

(10) Patent No.: US 7,361,094 B2
(45) Date of Patent: Apr. 22, 2008

(54) MULTI-PART PROPELLER SHAFT

(75) Inventor: Herbert Cermak, Bessenbach (DE)

(73) Assignee: GKN Driveline Deutschland GmbH (DE)

( * ) Notice: Subject to any disclaimer, the term of this patent is extended or adjusted under 35 U.S.C. 154(b) by 183 days.

(21) Appl. No.: 10/990,692

(22) Filed: Nov. 17, 2004

(65) Prior Publication Data

US 2005/0159226 A1    Jul. 21, 2005

(30) Foreign Application Priority Data

Nov. 17, 2003   (DE) ............................... 103 53 674

(51) Int. Cl.
*F16C 3/02* (2006.01)

(52) U.S. Cl. ...................... 464/183; 464/906

(58) Field of Classification Search ................ 464/145, 464/146, 183, 906, 140–144, 111, 905; 280/777
See application file for complete search history.

(56) References Cited

U.S. PATENT DOCUMENTS

| | | | | |
|---|---|---|---|---|
| 4,318,282 A | * | 3/1982 | Orain | .......................... 464/111 |
| 4,704,918 A | * | 11/1987 | Orkin et al. | ............. 464/183 X |
| 4,759,430 A | * | 7/1988 | Kalin | |
| 5,582,546 A | | 12/1996 | Welschof | |
| 6,217,456 B1 | * | 4/2001 | Jacob | ..................... 464/146 X |
| 6,379,255 B1 | | 4/2002 | Cermak et al. | |
| 6,585,601 B2 | * | 7/2003 | Booker et al. | .............. 464/146 |
| 7,025,686 B1 | * | 4/2006 | Aiken | .................... 464/183 X |
| 2003/0008716 A1 | * | 1/2003 | Boutin | |
| 2003/0096653 A1 | * | 5/2003 | Sugiyama et al. | .......... 464/146 |

FOREIGN PATENT DOCUMENTS

DE          34 08 940 A1     9/1985

* cited by examiner

*Primary Examiner*—Greg Binda

(57) ABSTRACT

A multi-part propeller shaft for transmitting torque in the driveline of a motor vehicle. The shaft includes a first shaft portion (3) having a shaft tube (11) with an inner diameter (d), a second shaft portion (4) with an outer diameter (D) which is smaller than the inner diameter (d) of the shaft tube (11), and a universal joint (5) connecting the two shaft portions. The universal joint (5) has been provided in the form of a nominal separating region, and, after the universal joint (5) has been disassembled, due to an axial force resulting from a crash event, the first and the second shaft portion (3, 4) can be inserted into one another. To be able to accommodate kinetic energy, a deformable energy absorbing mechanism is provided in the shaft tube. The energy absorbing mechanism can be a filler member, a friction sliding element and/or a friction-inducing sliding assembly.

5 Claims, 3 Drawing Sheets

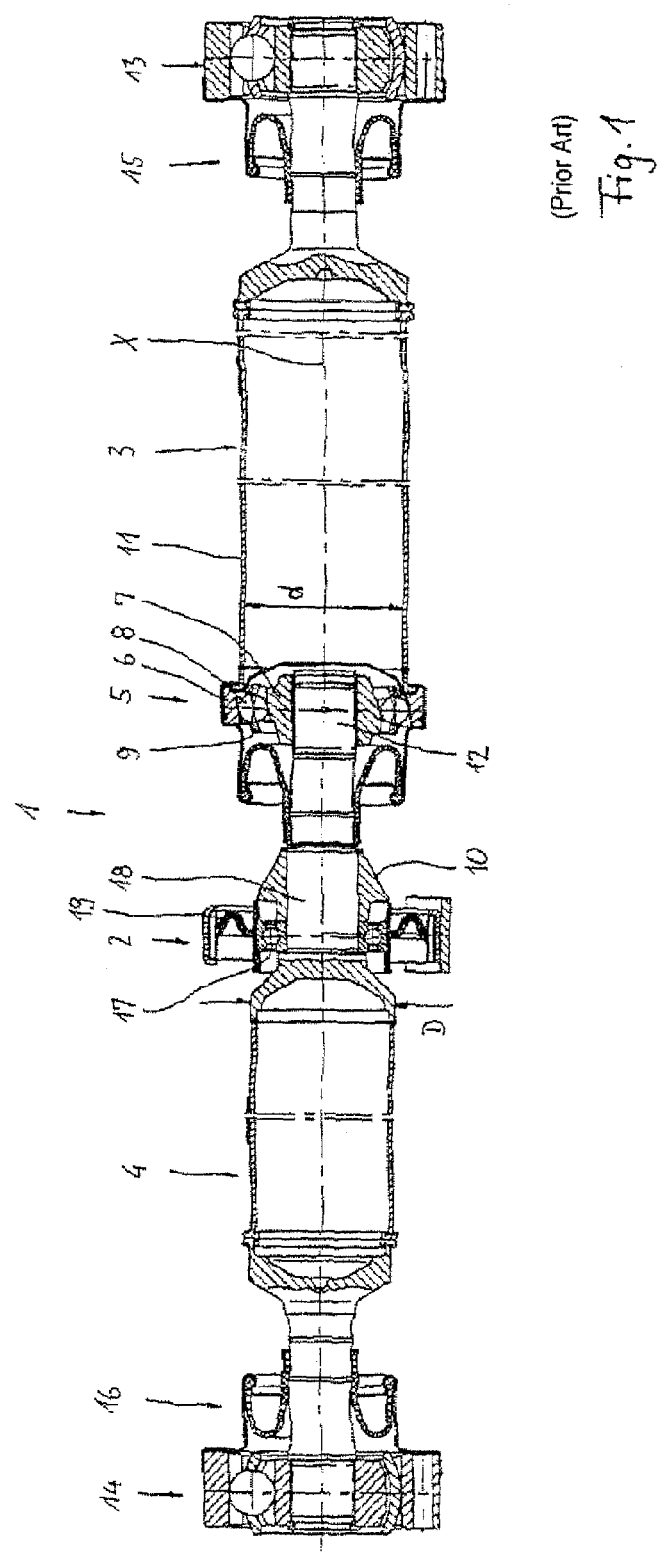
(Prior Art) Fig. 1

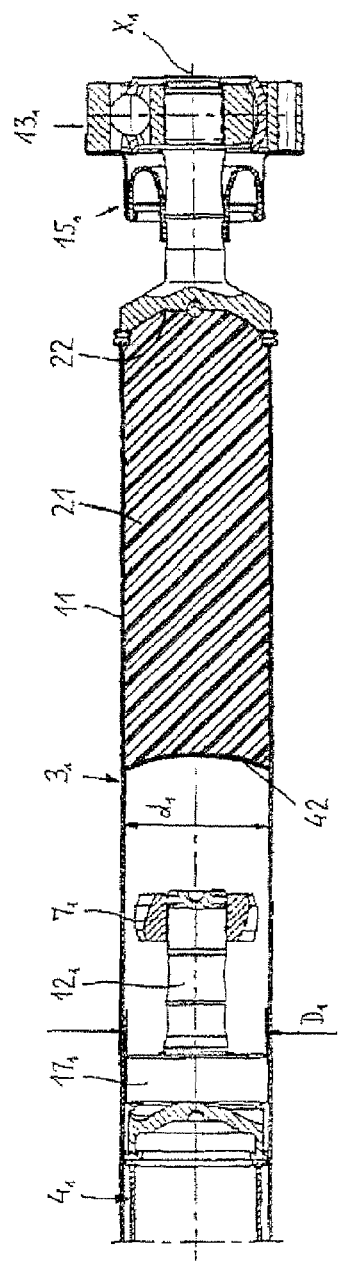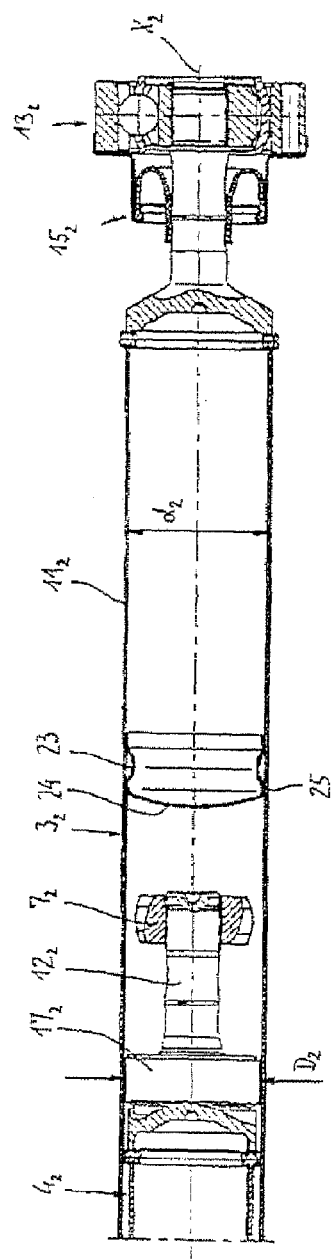

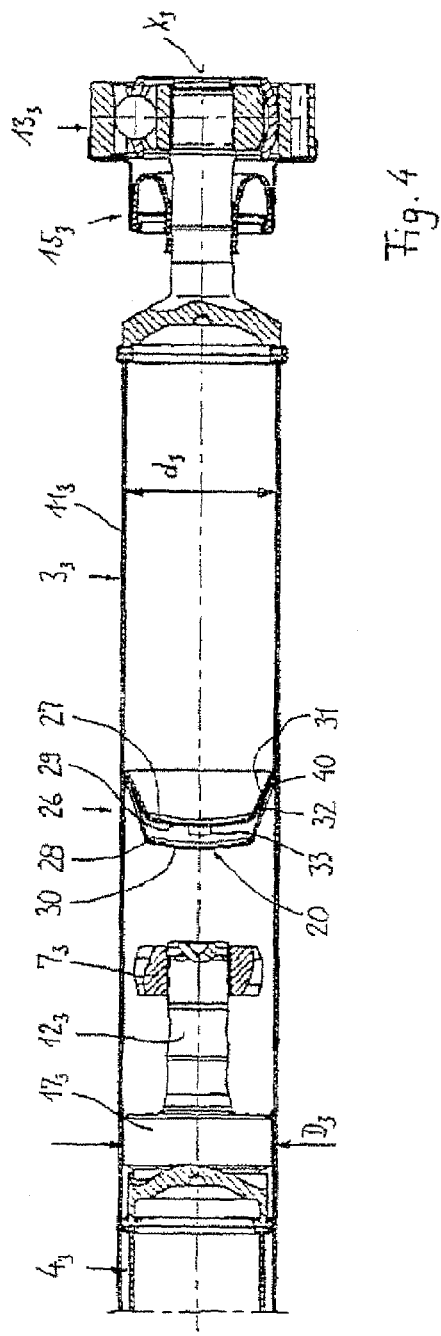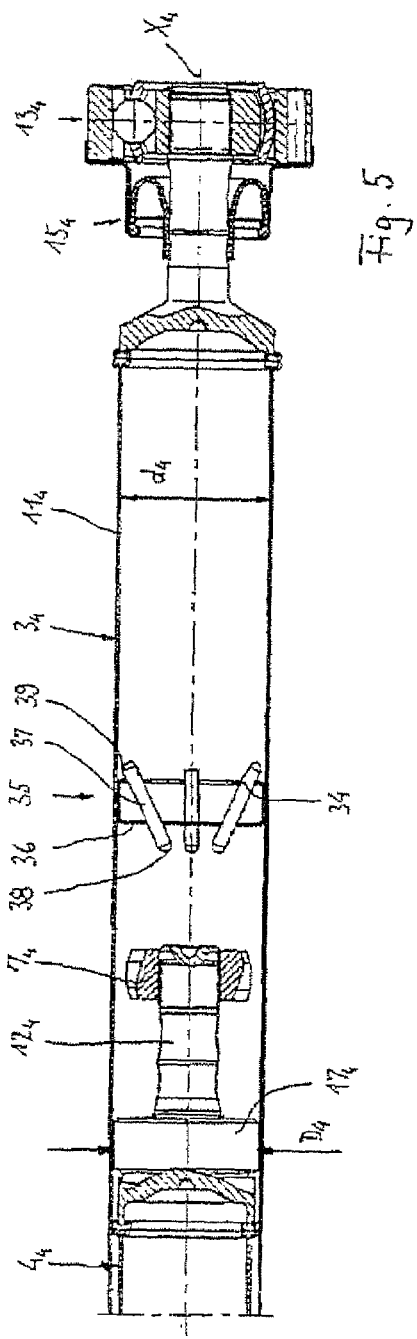

MULTI-PART PROPELLER SHAFT

TECHNICAL FIELD

The invention relates to a multi-part propeller shaft for transmitting torque in the driveline of a motor vehicle. The multi-part propeller shaft includes a first shaft portion, a second shaft portion and a universal joint connecting the two shaft portions and which can be a constant velocity joint.

BACKGROUND OF THE INVENTION

Propeller shafts of this type for motor vehicles are sufficiently known from the state of the art. For example, U.S. Pat. No. 6,379,255 shows a propeller shaft with two shaft portions which are connected to one another by a constant velocity joint, with an intermediate bearing being arranged so as to adjoin the constant velocity joint. The constant velocity joint comprises an outer joint part with outer ball tracks, an inner joint part with inner ball tracks, torque transmitting balls guided in a pair of opposed outer ball tracks and inner ball tracks, as well as a ball cage holding the balls. The outer joint part is firmly connected to a shaft tube of the one shaft portion, and the inner joint part is firmly connected to a journal adjoining the other shaft portion. The diameter dimensions of the two shaft portions and of the constant velocity joint have been selected to be such that, in the event of a crash, when an axial load is exceeded, the constant velocity joint and shaft fail in a controlled manner. That is, after the constant velocity joint fails, it is possible for the two shaft portions to move into one another in a telescopic and substantially force-free way if the maximum permissible displacement path of the constant velocity joint in the axial direction is exceeded.

In U.S. Pat. No. 5,582,546, there is known a propeller shaft of a similar type for motor vehicles which comprises a cage-less joint with axis-parallel ball grooves. The cage-less joint is suitable only for extremely small articulation angles in operation. With this design, a further insertion of the one shaft portion beyond the design-related standard displacement path is possible only if the outer joint part is dismantled and if the adjoining second shaft portion is deformed.

Accordingly, there exists a need for a multi-part propeller shaft having improved crash worthiness.

SUMMARY OF THE INVENTION

On the basis of the initially mentioned propeller shaft, the present invention provides a multi-part propeller shaft for transmitting torque in a driveline of a motor vehicle, which multi-part propeller shaft, in the case of a crash when a defined axial path is exceeded, permits the one shaft portion to move into the other shaft portion while simultaneously accommodating kinetic energy.

In accordance with one embodiment of the invention, a multi-part propeller shaft for transmitting torque in the driveline of a motor vehicle is provided having a first shaft portion with a shaft tube with an inner diameter; a second shaft portion with an outer diameter which is smaller than the inner diameter of the shaft tube; and a universal joint which connects the two shaft portions and which comprises an outer joint part firmly connected to the first shaft portion, an inner joint part firmly connected to a journal which is attached to the second shaft portion, torque transmitting balls, and a cage holding the balls. The universal joint can be disassembled under an axial force which the two shaft portions are able to accommodate without being damaged. Further, the first and the second shaft portion can be slid into one another after the universal joint has been disassembled due to an axial force. The first shaft portion provides a deformable filler member for absorbing kinetic energy when the two shaft portions are inserted or collapsed into one another.

According to this solution, an accident-related shortening of the propeller shaft is achieved in that the second shaft portion, which is guided by the outer joint part of the broken universal joint, slides telescopically into the first shaft portion. The advantage of this solution is that if a maximum axial force is exceeded, the one shaft portion moves into the other shaft portion, thus avoiding any uncontrolled bending of the multi-part propeller shaft in the region of the universal joint. At the same time, the kinetic energy between the two shaft portions is accommodated by the deformable filler member, and depending on the amount of kinetic energy, the second shaft portion can be slid deeply into the first shaft portion. A destruction of the individual components can precede, or take place simultaneously with, the disassembly operation after a threshold value of the maximum axial force acting on the propeller shaft has been exceeded. Different shapes of the filler member can achieve different absorption characteristics. Thus the type of material and shape of the filler material can be modified for adjusting the vehicle crash behavior and, in particular, the crash behavior of the propeller shaft assembly.

According to a further embodiment, the filler member fills the first shaft portion at least partially and is axially supported on a base of the first shaft portion. The filler member can be produced from an industrial foam, and the filler member can be elastically as well as plastically deformable.

A second solution according to the invention provides a multi-part propeller shaft for transmitting torque in a driveline of a motor vehicle, comprising a first shaft portion with a shaft tube with an inner diameter; a second shaft portion with an outer diameter which is smaller than the inner diameter of the shaft tube; and a universal joint which connects the two shaft portions and which comprises an outer joint part firmly connected to the first shaft portion, an inner joint part firmly connected to a journal which is attached to the second shaft portion, as well as torque transmitting balls. The universal joint can be disassembled under an axial force which the two shaft portions are able to accommodate without being damaged. The first and the second shaft portion can be slid into one another after the universal joint has been disassembled or fails due to an axial force. A sliding element is positioned in the shaft tube for absorbing kinetic energy when the two shaft portions are slid into one another. The sliding element comprises a base which can be loaded by the second shaft portion, and at least one friction ring for loading the shaft tube. This embodiment with a sliding element for absorbing kinetic energy has the same advantages as the above-mentioned solution with a filler member, and both are generically referred to as an energy absorbing mechanism.

According to one embodiment, the sliding element is held by a press fit In the shaft tube The sliding element is designed in such a way that the at least one friction ring is radially outwardly deformable when the second shaft portion impacts on the base of the sliding element. In this way, the friction ring is pressed against the tube wall and moves with friction in the tube wall when the two shaft portions are slid into one another, as a result of which kinetic energy is generated. The base can be shaped so as to be convex towards the second shaft portion.

A third solution in accordance with the invention provides a multi-part propeller shaft for transmitting torque in a driveline of a motor vehicle, comprising a first shaft portion with a shaft tube with an inner diameter; a second shaft portion with an outer diameter which is smaller than the inner diameter of the shaft tube; and a universal joint which connects the two shaft portions and which comprises an outer joint part firmly connected to the first shaft portion, an inner joint part firmly connected to a journal which is attached to the second shaft portion, and torque transmitting balls. The universal joint can be disassembled under an axial force which the two shaft portions are able to accommodate without being damaged. The first and the second shaft portion can be slid into one another after the universal joint has been disassembled or fails due to an axial force. A sliding assembly is positioned in the shaft tube for absorbing kinetic energy when the two shaft portions are slid into one another. The sliding assembly comprises a carrier element connected to the shaft tube and at least one friction element connected to the carrier element and comprising an impact face which can be loaded by the second shaft portion and at least one friction face for loading the shaft tube. The inventive embodiment with a sliding assembly has the same advantages as the above-mentioned embodiments with a filler member and sliding element, respectively. Again, each of the solutions can generically be referred to as including an energy absorbing mechanism. If, following an accident, the second shaft portion is slid into the first shaft portion, the friction element is actuated and, together with the friction face, loads the shaft tube of the first shaft portion.

According to another embodiment of the invention, the carrier element of the sliding assembly is held in the first shaft portion by a press fit. The sliding assembly is designed in such a way that, when the second shaft portion impacts, the friction element is deformed in such a way that it generates a much higher displacement resistance than is required initially for introducing the sliding assembly into the shaft tube.

According to a variant of the third embodiment, the carrier element and the at least one friction element are substantially dish-shaped and comprise a base facing the second shaft portion and a conical outer portion, wherein the friction element is positioned on the carrier element so as to extend towards the second shaft portion. In another embodiment of the invention, the conical casing portion of the friction element comprises a plurality of longitudinal slots, wherein the wings which are formed in this way and which comprise the friction faces are in contact with the conical outer face of the carrier element. Because the second shaft portion strikes the friction element, the latter is displaced towards the first carrier element, so that the wings slide off radially outwardly on the conical outer face of the carrier element, with the friction faces of the friction element being pressed against the tube wall of the shaft tube in a self-reinforcing way. With the two shaft portions continuing to be inserted into one another, the first shaft portion is radially outwardly deformed along the length of the axial displacement path, with kinetic energy being absorbed.

According to another variant of the embodiment comprising the sliding assembly, the carrier element comprises a plurality of bores whose axes intersect the longitudinal axis towards the second shaft portion. In each bore, a friction element in the form of a firmly inserted pin is included, wherein the ends of the pins facing the second shaft portion each form the impact faces and the opposed ends comprise the friction faces. The pins are connected to the friction element by welding, wherein the welds break off when the second shaft portion strikes the impact faces. The functional principle of this variant is similar to that of the first variant comprising the sliding assembly. Because the second shaft portion strikes the pins, the latter are broken off the carrier element and displaced axially towards the first shaft and at the same time radially outwardly. In the process, the tube wall of the shaft tube is deformed considerably, so that with the two shaft portions continuing to be inserted into one another, kinetic energy is converted substantially into deformation energy. In one example, three friction elements in the form of pins are provided which are actuated simultaneously.

The universal joints of the three solutions in accordance with the invention can be provided in the form of constant velocity fixed joints. The constant velocity fixed joints can also comprise a cage which holds the ball in the angle-bisecting plane.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

FIG. 1 is a longitudinal section through a multi-part propeller shaft in accordance with the state of the art.

FIG. 2 is a longitudinal section through a portion of an inventive multi-part propeller shaft with a filler member.

FIG. 3 is a longitudinal section through a portion of an inventive multi-part propeller shaft with a dish-shaped sliding element.

FIG. 4 is a longitudinal section through a portion of an inventive multi-part propeller shaft with a sliding assembly with two dish-shaped elements.

FIG. 5 is a longitudinal section through an inventive multi-part propeller shaft with a sliding assembly comprising three pins.

DETAILED DESCRIPTION OF THE DRAWINGS

FIG. 1 shows a propeller shaft 1 with an intermediate bearing 2, such as it is used for example in the driveline of a motor vehicle for transmitting torque from the manual gearbox to the axle differential; it is shown in an aligned condition relative to the longitudinal axis X. The propeller shaft 1 comprises a first shaft portion 3 and a second shaft portion 4 which are connected to one another by a universal joint 5. The universal joint 5 is provided in the form of constant velocity fixed joint and comprises an outer joint part 6 with outer ball tracks, an inner joint part 7 with inner ball tracks, torque transmitting balls 8 guided in a pair of opposed outer ball tracks and inner ball tracks, as well as a ball cage 9 which holds the balls 8 in the angle-bisecting plane.

The outer joint part 6 is firmly connected to a shaft tube 11 of the first shaft portion 3, and the inner joint part is firmly connected to a journal 12 of the second shaft portion 4. The intermediate bearing 2 with damping members 19 axially adjoins the universal joint 5, with the propeller shaft 1 being connected to the vehicle body (not shown) by said intermediate bearing 2. The propeller shaft 1 is rotatably supported by a rolling contact bearing 17 which is slipped on to a bearing portion 18 of the second shaft portion 4 in the intermediate bearing 2. The greatest outer diameter D of the second shaft portion 4 is smaller than the inner diameter d of the shaft tube 11, so that, in the case of an accident applying an inward axial force, after the universal joint 5 breaks apart, the propeller shaft 1 can be shortened by sliding the second shaft portion 4, guided by an introducing cone 10 entering the outer joint part 6, telescopically and in a nearly force-free way into the shaft tube 11 of the first shaft portion 3. At its ends, the propeller shaft 1 comprises constant velocity joints 13, 14 in the form of plunging joints which serve to provide a connection with a manual gearbox (not illustrated) and with an axle differential (not illustrated) of the motor vehicle. The plunging joints are sealed by sealing assemblies 15, 16 relative to the environment, thus preventing any dirt from entering, and lubricant from escaping from, the joint chambers.

FIG. 2 shows a propeller shaft according to one embodiment, comprising a filler member 21. The design and functioning largely correspond to the propeller shaft according to FIG. 1. To that extent, reference is made to the above description. Identical components have been given the same reference number with a subscript of 1. FIG. 2 shows an inventive propeller shaft after an accident, i.e. after the universal joint has been disassembled and while the second shaft portion $4_1$ is slid into the first shaft portion $3_1$. In the first shaft portion $3_1$ there is arranged a filler member 21 which partially fills the shaft tube $11_1$ and is supported on a base 22 of the first shaft portion $3_1$. The filler member 21 which can comprise a hardened industrial foam for example, serves to absorb the kinetic energy of the masses connected to the first shaft portion $3_1$ relative to the second shaft portion $4_1$ which kinetic energy has to be dissipated during the accident event. The journal $12_1$ penetrates the filler member 21 which, depending on the material, is plastically and/or elastically deformed while absorbing kinetic energy.

Suitable materials for the filler member 21 include foamed plastics or ceramics; cellular plastics, ceramics, or carbon fibers; or corrugated, honey-comb like plastic, ceramic, carbon or metal structures. Advantageously, the filler material should be lightweight and its length and form can vary depending upon the particular energy absorbing characteristics desired. The end of the filler member 21 towards the journal 12, may include a strike plate 42.

FIG. 3 partially shows a propeller shaft according to a second embodiment in a condition after the universal joint has been disassembled and prior to the two shaft portions being fully inserted into one another. The design and functioning largely correspond to those according to FIGS. 1 and 2 to which reference is hereby made. Identical components have been given the same reference numbers with a subscript of 2. Instead of the filler member according to FIG. 2, there is provided in the present embodiment a sliding element 23 which initially is firmly positioned in the shaft tube $11_2$ of the first shaft portion $3_2$. The sliding element 23 is substantially dish-shaped and comprises a base 24 as well as a friction ring 25 adjoining the base 24. The base 24 is convex towards the second shaft portion $4_2$, so that, when the journal $12_2$ strikes the base 24, the friction ring 25 is pressed radially outwardly. In this way, the shaft tube $11_2$ is loaded radially outwardly. When the two shaft portions $3_2$, $4_2$ continue to be inserted into one another, the journal $12_2$ pushes the sliding element 23 more deeply into the shaft tube $11_2$ which, in consequence, under friction, is displaced along the axial displacement path while accommodating kinetic energy. During the assembly of the multi-part propeller shaft, the sliding element 23, together with its friction ring 25, can be slid into the shaft tube $11_2$ by means of a press fit.

It could also be staked into place by welds, for example. The sliding element 23 can be formed from plate metal. The sliding element 23 is arranged approximately in the center of the shaft tube $11_2$, so that up to that point, the shaft portions $3_2$, $4_2$ can be inserted into one another in an almost force-free way and from that point onwards, absorb kinetic energy.

The sliding element 23 can also be used in conjunction with the filler member 21 to increase resistance. For example, the strike plate 42 of FIG. 2 may be formed like the sliding element 23 of FIG. 3. In such a case, the sliding element 23 can be in abutting or spaced relationship with the filler member 21.

FIG. 4 shows a third embodiment of an inventive propeller shaft which is illustrated partially and shows a condition after the disassembly of the universal joint and prior to the two shaft portions $3_2$, $4_2$ having been inserted into one another completely. The design and functioning largely correspond to those of the above embodiments to the description of which reference is hereby made. Identical components have been given the same reference number with a subscript of 3. Instead of the one-part sliding element 23 according to FIG. 3, there is provided in the present embodiment a two-part sliding assembly 26 which comprises a carrier element 27 and a friction element 28 positioned on the latter. The carrier element 27 is firmly connected to the shaft tube $11_3$ by means of a press fit, for example. The carrier element 27 and the friction element 28 are dish-shaped and each comprise a base 29, 30 facing the second shaft portion $4_3$, as well as an adjoining conical outer portion 31, 32. The base 30 of the friction element 28 forms an impact face 20 which can be loaded by the journal $12_3$. The outer portion 32 of the friction element 28 is axially longer than the outer portion 31 of the carrier element 27, so that the friction element 28 is held at a radial distance on the carrier element 27. The friction element 28, in its outer portion 32, comprises a plurality of regularly circumferentially distributed longitudinal slots 33 which extend as far as the radially outermost circumferential edge and thus form a plurality of wings with friction faces 40. When the journal $12_3$ strikes the base 30 of the friction element 28, the friction element 28 is axially displaced towards the carrier element 27, with the wings sliding off on the outer portion 31 and sliding off radially outwardly between the outer portion 31 and the shaft tube $11_3$. In this way, the shaft tube $11_3$ is loaded considerably towards the outside and deformed, as a result of which kinetic energy is accommodated. As the two shaft portions $3_3$, $4_3$ continue to be inserted into one another, the sliding assembly 26 is slid more deeply into the shaft tube $11_3$ which is plastically deformed and absorbs kinetic energy in the process. The sliding assembly 26 is arranged approximately in the center of the shaft tube $11_3$, so that up to that point, the shaft portions $3_2$, $4_2$ can be inserted into one another in an almost force-free way and from that point onwards, absorb kinetic energy.

FIG. 5 partially shows a fourth embodiment of an inventive propeller shaft which largely corresponds to the embodiments illustrated in the previous Figures, so that reference to their descriptions is hereby made. Identical components have been given the same reference numbers with a subscript of 4. In contrast to the variant comprising a dish-shaped sliding assembly according to FIG. 4, the present variant is provided with a sliding assembly 35 with a carrier element 36 and three friction elements which are fixed therein and which are provided in the form of pins 37. The carrier element 36 is inserted into the shaft tube $11_4$ by means of a press fit, for example. It is formed out of plate metal and comprises a cylindrical outer face. In the carrier element 36 there are provided bores 34 in which there are held the pins 37 on axes extending at an angle relative to the longitudinal axis $X_4$ of the propeller shaft. The pins 37 are firmly connected to the carrier element 36 by welding for example and, after having overcome the connecting force, are able to be displaced in the bores 34. The pin ends facing the second shaft portion 44 each form impact faces 38 which can be loaded by the journal $12_4$. When the journal $12_4$ strikes the pins 37, the welded connection is released and the pins 37 are guided in the bores of the carrier element 36 and displaced axially towards the universal joint $13_4$, so that its friction faces 39 radially enter the shaft tube $11_4$ and cause same to bulge or deform outwardly. As the two shaft portions $3_4$, $4_4$ are inserted into each other further, with the journal $12_4$ contacting the carrier element 36, the entire sliding assembly 35 is slid more deeply into the shaft tube $11_4$, with the pins 37 which radially project beyond the inner contour of the shaft tube $11_4$ forming furrows in the shaft tube $11_4$, while accommodating kinetic energy.

While the invention has been described in connection with several embodiments, it should be understood that the invention is not limited to those embodiments. For example, the sliding assemblies 26, 35 could also be used together with a filler member 21 to further increase the energy absorbing capacity of the propeller shaft assembly. Thus, the invention covers all alternatives, modifications, and equivalents as may be included in the spirit and scope of the appended claims.

What is claimed is:

1. A multi-part propeller shaft for transmitting torque in a driveline of a motor vehicle, comprising:
    a first shaft portion having a shaft tube with an inner diameter (d), the first shaft portion further having a base connected to an end of said shaft tube and a deformable filler member at least partially filling the first shaft portion and being axially supported on said base;
    a second shaft portion having a journal at one end; and
    a universal joint connecting the two shaft portions and comprising an outer joint part connected to the first shaft portion, an inner joint part connected to said journal of said second shaft portion, and torque transmitting balls,
    wherein the universal joint can be disassembled under an axial force which the first and second shaft portions are able to accommodate without being damaged,
    wherein the second shaft portion has a greatest outer diameter (D) which is smaller than the inner diameter (d) of said first shaft tube such that the first and the second shaft portions can be slid into one another in a substantially force-free way after the universal joint has been disassembled due to the axial force, the sliding occurring up to said journal engaging said deformable filler member, and
    wherein, from that point onwards, the filler member engaged by said journal absorbs kinetic energy when the two shaft portions are further slid into one another by the axial force.

2. A shaft assembly according to claim 1, wherein the filler member comprises foamed plastic or ceramic.

3. A shaft assembly according to claim 1, wherein the filler member is plastically deformable.

4. A shaft assembly according to claim 1, wherein the filler member is closed by a cover plate.

5. A multi-part propeller shaft for transmitting torque in a driveline of a motor vehicle, comprising:
    a first shaft portion with a first shaft tube having an inner diameter (d), with a base connected to an end of the first shaft tube and with an energy absorbing mechanism arranged in said first shaft tube;
    a second shaft portion with a journal at an end of said second shaft portion and with a second shaft tube connected to said journal;
    a universal joint connecting the two shaft portions and comprising an outer joint part connected to the first shaft portion, an inner joint part connected to said journal of said second shaft portion, and torque transmitting balls;
    wherein the universal joint can be disassembled under an axial force which the first and second shaft portions are able to accommodate without being damaged,
    wherein the second shaft tube of said second shaft portion has a greatest outer diameter (D) which is smaller than the inner diameter (d) of said first shaft tube such that the first and the second shaft portions can be slid into one another in a substantially force-free way after the universal joint has been disassembled due to the axial force, up to said journal engaging said energy absorbing mechanism;
    wherein, from that point onwards, the energy absorbing mechanism engaged by said journal absorbing kinetic energy when the two shaft portions are further slid into one another by the axial force.

* * * * *